(12) United States Patent
Rice

(10) Patent No.: US 8,237,066 B2
(45) Date of Patent: Aug. 7, 2012

(54) WEIGHING APPARATUS EMPLOYING LOAD CELLS OF DIFFERENT CAPACITY

(75) Inventor: Thomas S. Rice, Columbus, OH (US)

(73) Assignee: Mettler-Toledo, LLC, Columbus, OH (US)

( * ) Notice: Subject to any disclaimer, the term of this patent is extended or adjusted under 35 U.S.C. 154(b) by 289 days.

(21) Appl. No.: 12/649,791

(22) Filed: Dec. 30, 2009

(65) Prior Publication Data

US 2011/0155474 A1 Jun. 30, 2011

(51) Int. Cl.
*G01G 19/00* (2006.01)
(52) U.S. Cl. .......................... 177/50; 177/199
(58) Field of Classification Search ............... 177/50, 177/199, 200
See application file for complete search history.

(56) References Cited

U.S. PATENT DOCUMENTS

| | | | |
|---|---|---|---|
| 4,159,521 A | 6/1979 | Hall et al. | |
| 4,204,197 A | 5/1980 | Loshbough et al. | |
| 4,375,243 A * | 3/1983 | Doll | 177/25.17 |
| 4,502,555 A | 3/1985 | Gower | |
| 4,632,198 A * | 12/1986 | Uchimura | 177/211 |
| 4,706,767 A * | 11/1987 | Chou | 177/50 |
| 4,711,314 A * | 12/1987 | Suzuki et al. | 177/164 |
| 4,778,016 A * | 10/1988 | Uchimura et al. | 177/164 |
| 4,804,052 A | 2/1989 | Griffen | |
| 4,815,547 A | 3/1989 | Dillon et al. | |
| 4,909,338 A * | 3/1990 | Vitunic et al. | 177/50 |
| 5,004,058 A | 4/1991 | Langford et al. | |
| 5,190,117 A * | 3/1993 | Freeman et al. | 177/244 |
| 7,076,990 B2 * | 7/2006 | Yoshikuwa | 73/1.13 |
| 7,977,586 B2 * | 7/2011 | Fujii et al. | 177/45 |
| 8,134,090 B2 * | 3/2012 | Duppre | 177/119 |

FOREIGN PATENT DOCUMENTS

| | | |
|---|---|---|
| DE | 3409202 A1 | 9/1985 |
| GB | 1462808 A | 1/1977 |
| JP | 62-032323 A * | 2/1987 |
| JP | 62-032324 A * | 2/1987 |
| JP | 08-043184 A * | 2/1996 |
| JP | 2008-185430 A * | 8/2008 |

* cited by examiner

*Primary Examiner* — Randy W Gibson
(74) *Attorney, Agent, or Firm* — Standley Law Group LLP

(57) ABSTRACT

A weighing apparatus having a load receiving element and a plurality of load cells directly or indirectly associated with the load receiving element such that when an object to be weighed is placed on the load receiving element, the weight of the object is unevenly applied to the load cells. The weighing apparatus includes load cells of different capacity based on the uneven loading applied thereto.

17 Claims, 4 Drawing Sheets

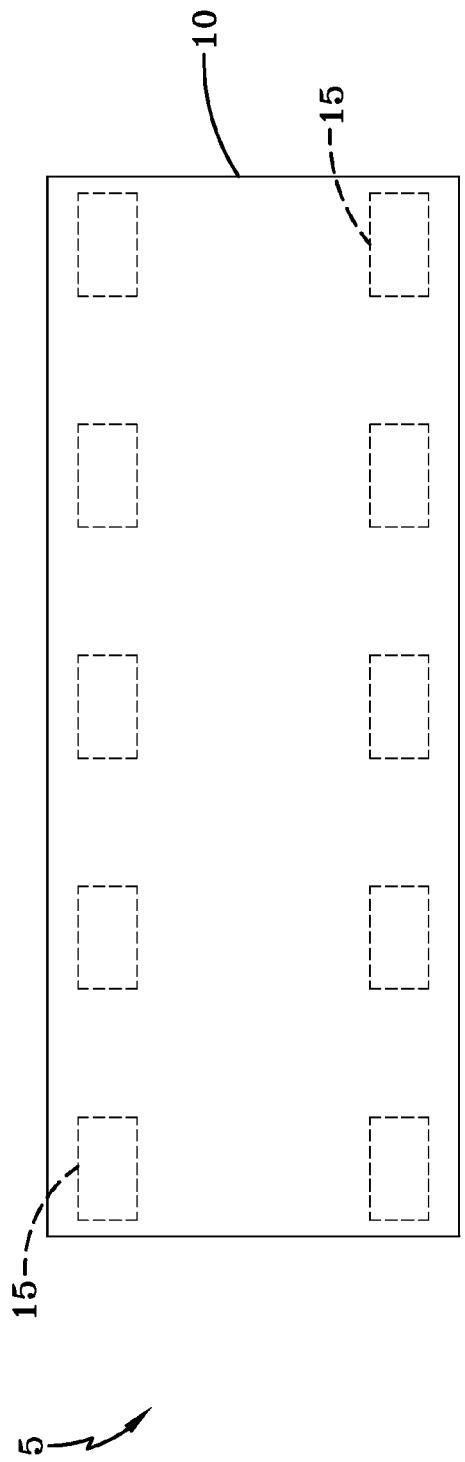
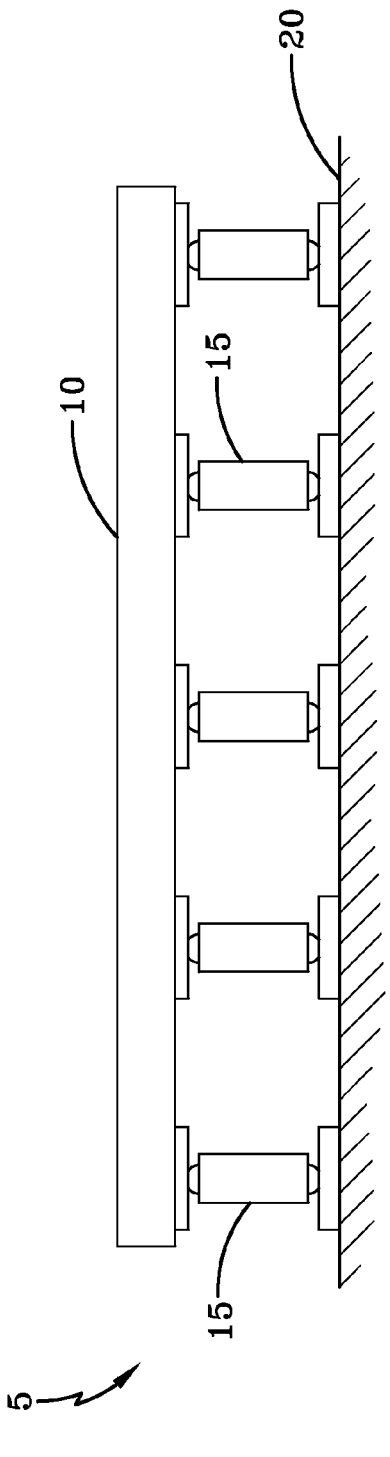

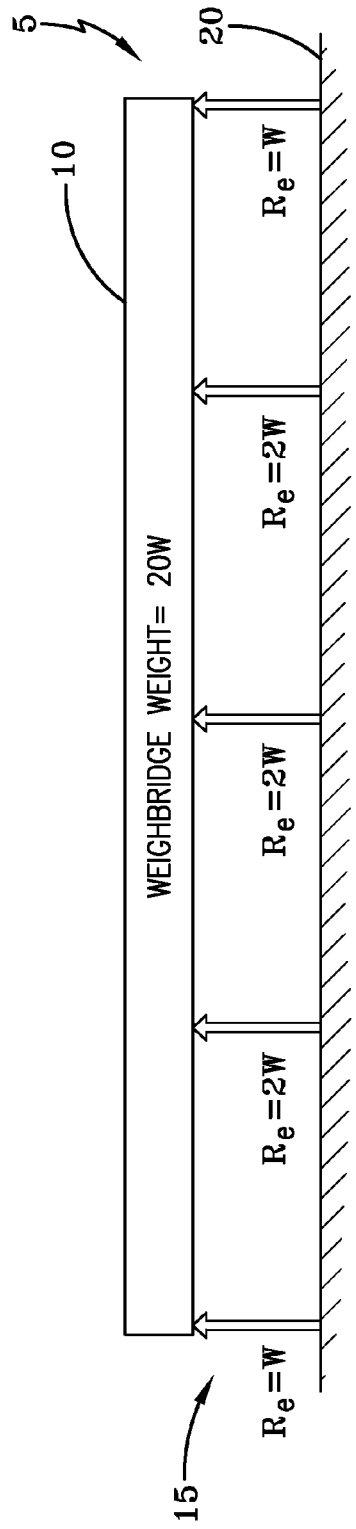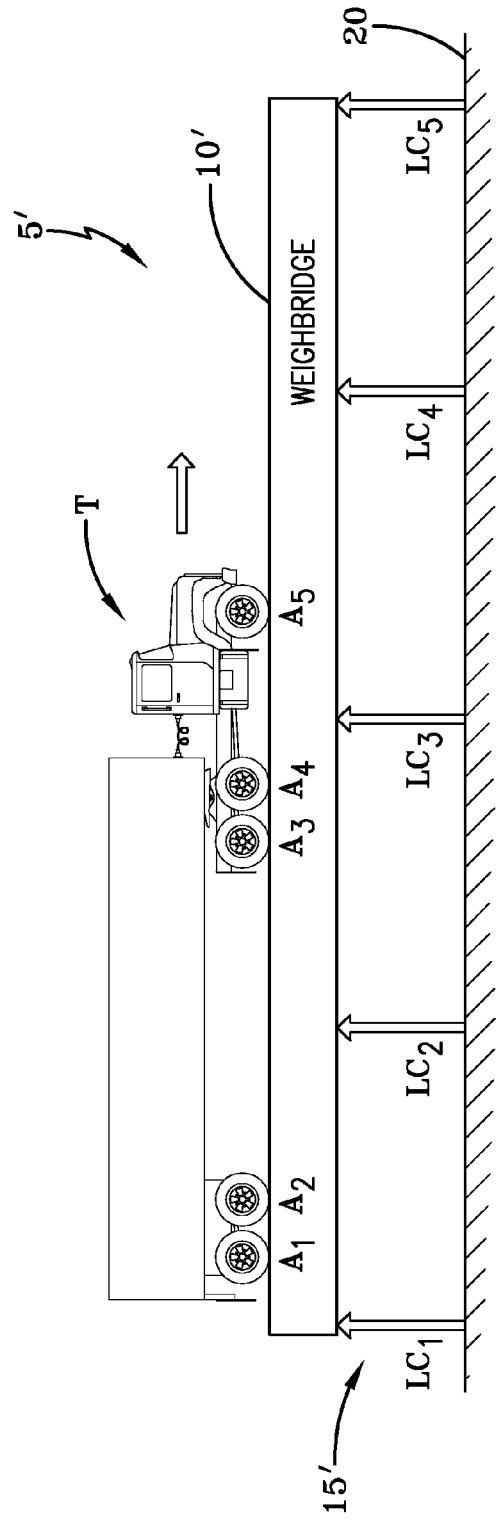

WEIGHING APPARATUS EMPLOYING LOAD CELLS OF DIFFERENT CAPACITY

TECHNICAL FIELD

The present invention is directed to a weighing apparatus, such as a weighing scale. More particularly, the present invention is directed to a weighing apparatus that includes load cells of different capacity (sensitivity).

BACKGROUND OF THE INVENTIVE FIELD

One common weighing apparatus is a weighing scale. Various weighing scales (or scales), such as those for weighing vehicles or other objects, typically include a load receiving element, conveyor belt, or other load receiving element for receiving an object to be weighed. The load receiving element is normally supported by a plurality of subjacent load cells, which load cells may have an analog or digital output. The weight of an object residing on the load receiving element exerts a force of some magnitude on each load cell. The magnitude of the force imparted to a load cell corresponds to the portion of the weight of the object supported by the given load cell.

In weighing scales employing multiple analog load cells, the load cells are typically electrically connected in parallel to form a combined circuit and the output of that combined circuit is, in effect, the average of the load cell outputs. The outputs are connected to a secondary device (e.g., a meter) whose function is to convert the combined circuit output into a weight value. Because metrology requirements dictate that a scale must provide weights that are independent of object position on the load receiving element, the sensitivities of the load cells must be adjusted to be substantially equal. To accomplish this, the output of more sensitive load cells is adjusted to that of less sensitive load cells, either by lowering the excitation voltage supplied to more sensitive load cells or by adding an isolated resistor across their outputs. The resultant circuit output then becomes representative of the output of the least sensitive load cell.

As described above, the load cells of a weighing scale employing multiple analog load cells are typically electrically connected in parallel. Consequently, and as would be well understood by one of skill in the art, the overall sensitivity of such a weighing scale is reduced as the total number of load cells is increased.

In contrast to the above-described analog construction, a weighing scale may employ digital load cells, meaning that each load cell produces a numerical value as output, the numerical value indicative of the force imparted thereto by the presence of an object on the load receiving element. One embodiment of such a digital load cell is described in U.S. Pat. No. 4,815,547. In a weighing scale employing digital load cells, the output of each load cell is corrected to compensate for different locations of a load on the load receiving element. To this end, a multiplicative correction factor may be determined for each load cell in order to provide a scale output that is independent of object position on the load receiving element. Larger factors are applied to load cells that are less sensitive and smaller factors are applied to load cells that are more sensitive. Load cell correction factors can determined in any number of ways, such as by the technique described in U.S. Pat. No. 4,804,052. The scale output of such a digital system is determined by numerically summing the outputs of all the load cells of the scale.

Digital load cells need not be connected in parallel, as is typically the case in a weighing scale using a plurality of analog load cells. Rather, the weight of a load placed on a weighing scale employing digital load cells is determined by numerically summing the outputs of the individual digital load cells, as opposed to converting the output of a combined circuit of analog load cells into a weight value. As such, in contrast to a weighing scale employing a number of analog load cells, the sensitivity of a weighing scale employing a number of digital load cells does not decrease as the number of load cells is increased.

In the past, it has been common practice to manufacture both analog and digital type weighing scales utilizing load cells of like capacity. Correction of load cell output once assembled to the scale structure and exposed to a load is then accomplished as described above, depending on whether the scale uses analog or digital load cells.

It has been determined, however, that the load cells of a multiple-load cell scale often do not support an equal portion of the weight of a given object to be weighed. Rather, and as will be explained and illustrated in more detail below, one or a group of load cells typically supports more of the object weight than another load cell or another group of load cells.

It would be understood by one of skill in the art that known and typical scale design would require the selection of load cells having a like sensitivity and, therefore, a capacity sufficient to accommodate the highest loading likely to be seen by the associated scale. However, in considering the above-described disproportionate weight distribution among the load cells of a multiple-load cell scale, it can also be understood that this is not a desirable situation. Particularly, even though certain load cells of such a typical scale will likely be exposed to less force than other load cells, their capacity will nonetheless be the same as those load cells that will be exposed to greater forces. Consequently, these former load cells will have excess capacity and such a design may result in a scale of reduced sensitivity.

As would be obvious, load cells of greater capacity generally cost more than load cells of less capacity due to their larger size, more robust construction, etc. Consequently, at least in the case of a weighing scale constructed with digital load cells (or possibly, analog load cells connected to one or more digital conversion boxes), using load cells of lesser capacity where possible can reduce the overall cost of the scale. To that end, there is a cost benefit to constructing a digital load cell weighing scale in this manner. As is discussed in more detail below, there may also be a metrology benefit.

SUMMARY OF THE GENERAL INVENTIVE CONCEPT

As described above, there may be several practical and significant advantages to providing a weighing scale with digital load cells of different capacity. Alternatively, such an advantage may also be achievable by providing a weighing scale with analog load cells of different capacity, wherein the analog load cells are connected to one or more junction or similar boxes at which the outputs of the load cells are converted to digital form and correction factors are applied. Such conversion and correction may be accomplished with one or more analog-to-digital (A/D) converters and associated electronics, as would be well understood by one of skill in the art While analog load cells may be used as described above, only digital load cells will be referred to hereafter for purposes of clarity.

As one example, it is well known that in a typical vehicle scale, the load cells associated with the inner weighing sections of the load receiving element commonly experience approximately twice the dead load experienced by the load cells in the end sections. Additionally, as vehicles (particularly vehicles with axle groups) enter and exit the load receiving element, the inner load cells experience a greater live load than the load cells at the approach and exit because of load sharing that occurs as the vehicle traverses the scale.

If the digital load cells associated with the end sections of such a vehicle scale are replaced with digital load cells of reduced capacity, it can be understood that the cost of the weighing scale could be reduced without affecting its functionality. Further, because the load cells are of digital design, the dissimilar sensitivities can be easily accounted for.

As mentioned above, there may also be a metrology benefit to employing digital load cells of different sensitivity. This benefit is based on the fact that the minimum scale division size ($e_{MIN}$) allowed in typical weights and measures applications is dependent upon the number (N) of load cells in the scale and the load cell verification interval value ($V_{MIN}$). By placing digital load cells of different sensitivities in a scale, it may be possible to produce a scale of lesser minimum scale division while using a greater number of total load cells. A better understanding of this metrology benefit, as well as the overall invention, may be acquired by a review of the specific examples provided below.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 is a top view of one exemplary embodiment of a multiple-load cell weighing scale;

FIG. 2 is a side view of the exemplary weighing scale of FIG. 1;

FIG. 3a schematically illustrates the dead loads experienced by the load cells of the exemplary weighing scale of FIGS. 1-2;

FIG. 3b schematically illustrates the live loads experienced by the load cells of an exemplary vehicle weighing scale as the scale is traversed by a truck of given size and weight;

DETAILED DESCRIPTION OF EXEMPLARY EMBODIMENT(S)

Figure 4:
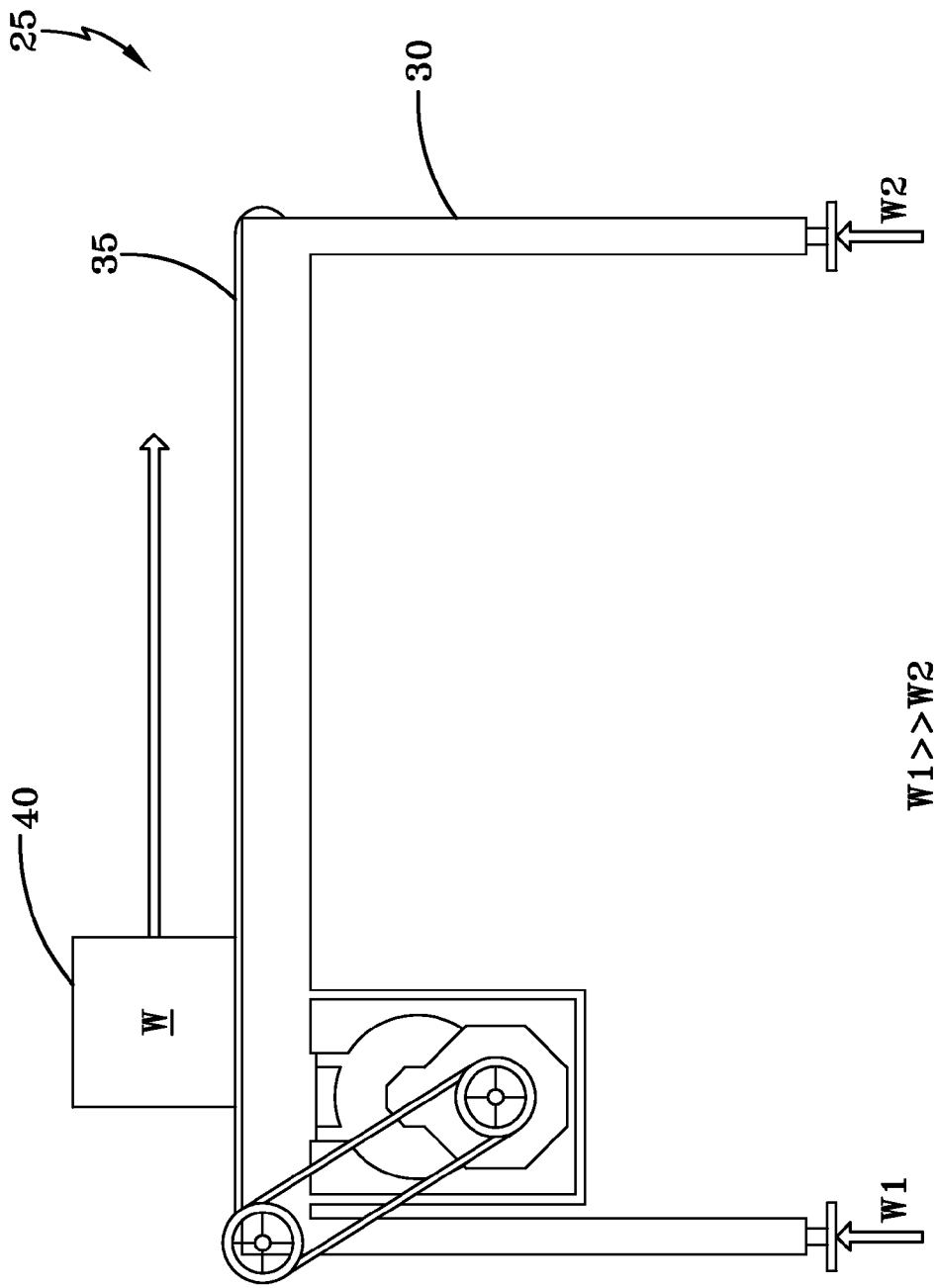
FIG. 4 depicts an exemplary horizontal conveyor scale having multiple load cells.

One exemplary embodiment of a multiple-load cell vehicle scale 5 is illustrated in FIGS. 1-2. As shown, this exemplary scale 5 includes a load receiving element 10 supported by ten subjacent digital load cells 15 that are arranged in rows of two along the length of the load receiving element. The load cells 15 reside between an underside of the load receiving element 10 and the ground 20 or another support surface. In this particular example, the load cells 15 are of rocker pin design, such that the load cells may tilt in response to the entry or exit of a vehicle and subsequently return to substantially the same upright position. Such load cells are well known in the art (see e.g., U.S. Pat. No. 4,815,547). The present invention is also applicable to other scale and load cell designs.

When an object to be weighed (a vehicle, in this case) is located on the load receiving element 10, the weight of the vehicle exerts a force on the load cells 15, each of which generate a digital output signal indicative of the weight supported by that load cell. Typically, the load cell output is corrected, as described above and as would be well known to one of skill in the art. These digital signals can be summed to obtain the weight of the vehicle on the load receiving element. One skilled in the art would also understand that a variety of such scales exist, and this particular embodiment is presented only for purposes of illustration.

As described above, the load cells of a multiple-load cell scale often do not support an equal portion of the weight of a given object to be weighed. Rather, one or a group of load cells typically supports more of the object weight than another or another load cell or group of load cells. For example, in a typical vehicle scale, the load cells associated with the inner weighing sections of the scale load receiving element commonly experience approximately twice the dead load experienced by the load cells in the end sections. Additionally, as vehicles (particularly vehicles with axle groups) enter and exit the load receiving element, the inner load cells experience a greater live load than the load cells at the approach and exit because of load sharing that occurs as the vehicle traverses the scale.

The dead load situation is illustrated in FIG. 3a, which shows the weight distribution experienced by the load cells 15 of the scale 5 shown in FIGS. 1-2 (with upward force arrows representing the load cells). As explained above, and as shown in FIG. 3a, each load cell of the four inner rows Ri of load cells 15 supports approximately twice the amount of weight (2 W) as each load cell of the rows of load cells Re situated near each end of the load receiving element 10. Obviously, in other scales this uneven weight distribution may affect a different number of load cells and/or load cells in different locations than that shown in this particular example.

An exemplary but real world live load situation is illustrated in FIG. 3b (not drawn to scale), which represents the weight distribution experienced by the load cells 15' of another vehicle scale 5' that is similar to the vehicle scale 5 (with upward force arrows representing the load cells). In FIG. 3b, a truck T traverses the load receiving element 10' of the scale 5' in the direction indicated by the arrow. In this particular example, the truck T is shown to have five axles, with the weight supported by each of the four rearward axles $A_1, A_2, A_3, A_4$ being 27,500 lb. and the weight supported by the front axle $A_5$ being 16,000 lb. The distance between truck axles is as follows: $A_1$-$A_2$=48"; $A_2$-$A_3$=120"; $A_3$-$A_4$=48"; $A_4$-$A_5$=72". The distance between the load cells of the scale 5' is as follows: weighbridge edge-$LC_1$=3"; $LC_1$-$LC_2$=208.5"; $LC_2$-$LC_3$=208.5"; $LC_3$-$LC_4$=208.5"; $LC_4$-$LC_5$=208.5"; $LC_5$-weighbridge edge=3".

The maximum live load experienced by each of the rows of load cells as the truck T traverses the scale 5' is: $LC_1$=54,800 lb., $LC_2$=72,400 lb., $LC_3$=72,500 lb., $LC_4$=72,400 lb., and $LC_5$=53,200 lb. Therefore, it is clear that the maximum load experienced by the inner three rows of load cells $LC_2$-$LC_4$ due to the traversing truck is significantly greater than that experienced by the rows of load cells $LC_1$, $LC_5$ situated near the entry and exit ends, respectively, of the vehicle scale 5'. As with the dead load weight distribution represented in FIG. 3a, the uneven live load distribution illustrated in FIG. 3b may be different for other weighing scale designs and could also obviously be affected by scale length, load cell span and the physical characteristics of the vehicle traversing the scale.

Referring still to FIGS. 3a-3b, it can be understood that if the load cells 15 of the end rows are replaced with load cells of less capacity, the cost of producing the scales 5, 5' could be reduced without affecting its functionality. Because the load cells are of digital design, the sensitivity differences associated with load cells of dissimilar capacity may be easily accounted for. This benefit would also, of course, carry over to scales of other designs wherein the uneven weight distribution may not be identical to that shown in FIGS. 3a-3b.

The ability to utilize load cells of different capacity is not limited to vehicle scales. For example, many general industrial weighing applications exist where a far greater dead load may be experienced by certain load cells of a weighing apparatus than by other load cells of the weighing apparatus.

FIG. 4 simplistically depicts an exemplary horizontal conveyer scale 25 that is illustrative of such a situation. The horizontal conveyer scale 25 includes a support frame 30 and a moving horizontal conveyor belt 35 that transports objects to be weighed 40 (of some weight W) in the direction indicated by the arrow. In this particular embodiment, pairs of load cells (represented by arrows W1 and W2) are provided at opposite ends of the scale 25 to determine the weight of objects 40 as they travel on the conveyor belt 35.

As shown, the motor 30 and associated drive components 35 of the horizontal conveyer scale 25 are commonly mounted near one end thereof. As a result, the dead load is significantly imbalanced, with far more dead load placed at one end of the scale than. the other. Consequently, the force imparted to the first load cell pair (as represented by W1) will be significantly greater than the force imparted to the second load cell pair (as represented by W2).

Figure 5:
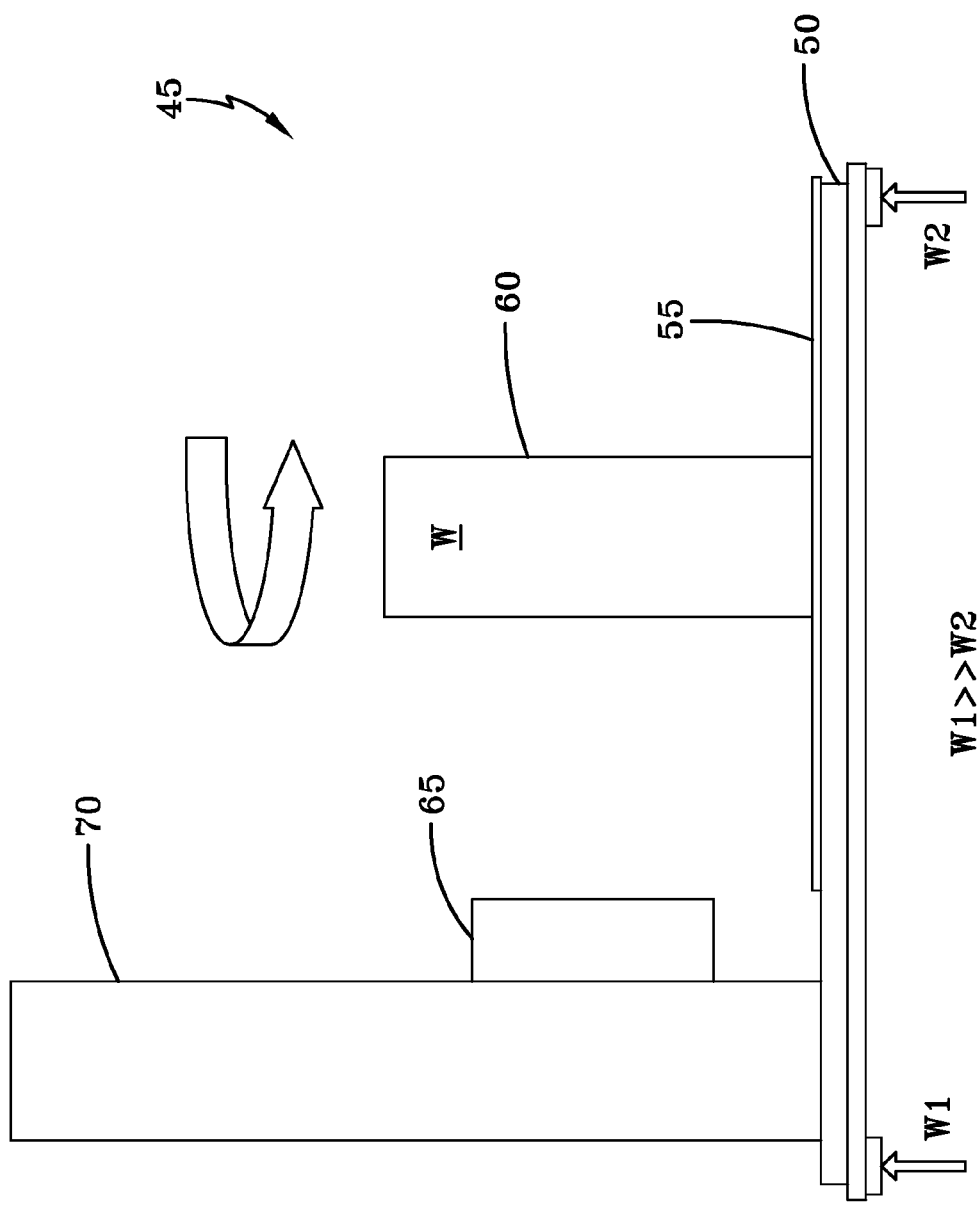
FIG. 5 depicts an exemplary rotating pallet wrapper scale having multiple load cells.

An exemplary rotating pallet wrapper scale 45 is schematically depicted in FIG. 5. The rotating pallet wrapper scale 45 is another example of a non-vehicle scale apparatus that may benefit from the teachings of the present invention. The rotating pallet wrapper scale 45 includes a support frame 50 and a rotating load receiving load receiving element 55. Objects 60 (of some weight W) that are to be wrapped with plastic or similar materials prior to shipment may be placed on the rotating load receiving load receiving element 55 and rotated to envelop them in a wrapping of such material supplied from a wrapping carriage 65. In this particular embodiment, pairs of load cells (represented by arrows W1 and W2) are provided at opposite ends of the scale 45 to determine the weight of objects 60 as they reside on the rotating load receiving load receiving element 55.

As shown, the mast 70 that houses the rotating load receiving load receiving element 55 drive and wrapping carriage 65 is located to one side of the scale 45. As a result, the dead load is significantly imbalanced, with far more dead load placed at one end of the scale than the other. Consequently, the force imparted to the first load cell pair (as represented by W1) will be significantly greater than the force imparted to the second load cell pair (as represented by W2).

In both the horizontal conveyer scale 25 and the rotating pallet wrapper scale 45 described above, the live load due to the presence of an object to be weighed is distributed fairly evenly between the load cells at either end of the scale. That is, the load cells at either end of the scales experience similar loadings as the object to be weighed is being processed and weighed. However, because of the significantly imbalanced dead load, load cells with a greater sensitivity than would otherwise be necessary are normally used in order to avoid overloading the load cells during scale operation.

In a traditional analog system, higher capacity load cells would need to be installed everywhere, effectively reducing the sensitivity of the device. In a digital system, however, load cells of different individual capacity may be used to accommodate the different loading conditions, while simultaneously optimizing (maximizing) the overall scale sensitivity.

Referring again to FIGS. 3a-3b, the aforementioned metrology benefit of using digital load cells of different sensitivity can be better understood. In this regard, it is important to realize that the minimum scale division size ($e_{MIN}$) allowed in typical weights and measures applications is dependent upon the number of load cells (N) in the scale and the load cell verification interval value ($V_{MIN}$). This is represented by the formula:

$$d \leq \sqrt{(\Sigma_{i=1}^{N}(V_{MINi})^2)}$$

Where: d=scale division
N=number of load cells in scale
$V_{MIN\ i}$=verification interval value of load cell i The specification $V_{MIN}$ is a parameter relating to the temperature compensation of zero load output of the load cell and is typically proportional to capacity. Since load cells of lower capacity are generally specified with a lower $V_{MIN}$ value, it can be understood that a larger number of lower capacity load cells may be used in a given scale without increasing its division size. Also, for a given capacity, load cells with a larger $V_{MIN}$ value are easier and less costly to produce than more highly compensated load cells with smaller $V_{MIN}$ values.

As one specific example of the metrology benefit afforded by employing load cells of different capacity, consider a scale similar to the vehicle scale 5 shown in FIGS. 1-2, but having 16 load cells. If $V_{MIN}$ for each load cell is 5 lbs., then the minimum scale division size is calculated to be 20 lbs. as follows:

$$d \leq \sqrt{(16)(5)^2}$$

$$d=20$$

However, if that same scale were lengthened to accommodate, for example, 18 load cells, then the minimum scale division size is calculated to be:

$$d \leq \sqrt{(18)(5)^2}$$

$$d=21.21$$

Because d is greater than 20 lbs. when 18 load cells are present, the minimum scale division would need to be increased to the next higher weights and measures allowable scale division, which is 50 lbs.

However, if the load cells at the ends of the load receiving element are replaced with load cells having approximately half the capacity of the interior rows of load cells, as previously described, and assuming that the $V_{MIN}$ for these load cells were reduced by one half as well (i.e., $V_{MIN}$=2.5 lbs), as would be typical, then the scale division size would be calculated as:

$$d \leq \sqrt{((4)(2.5)^2)+((14)(5)^2)}$$

$$d=19.36$$

Therefore, since d=19.36 is less than 20, it is clear that using load cells of different capacity may permit the construction of a larger scale (scale with more load cells) while maintaining a higher precision than would otherwise be possible.

It can be understood from the foregoing description of exemplary embodiments that there may be several practical and significant benefits associated with constructing a scale using load cells of different capacity. As would be apparent to one of skill in the art, such scales may vary in type, design, size, etc., and the particular embodiments shown and described herein have been provided solely for the non-limiting purpose of illustration. Therefore, while certain exemplary embodiments of the present invention are described in detail above, the scope of the invention is not to be considered limited by such disclosure, and modifications are possible without departing from the spirit of the invention as evidenced by the following claims:

What is claimed is:

1. A weighing apparatus, comprising:
 a plurality of load cells, at least some of which are digital load cells adapted to provide a digital representation of a load thereon, and at least some of which are of different capacity; and
 a load receiving element for receiving an object to be weighed, said load receiving element directly or indirectly associated with said plurality of load cells;
 wherein the weight of each object to be weighed while residing on said load receiving element will be unevenly distributed across said plurality of load cells in a substantially known and like manner; and
 wherein individual load cells are arranged along said load receiving element such that the capacity of a given individual load cell is commensurate with the proportion of the load that will be borne by that load cell as a result of the unevenly distributed weight of an object to be weighed by the weighing apparatus.

2. The weighing apparatus of claim 1, wherein said weighing apparatus is a vehicle scale.

3. The weighing apparatus of claim 2, wherein the capacity of load cells located near entry and exit ends of said load receiving element is less than the capacity of load cells located therebetween.

4. In a weighing apparatus having a plurality of load cells directly or indirectly supporting a load receiving element for receiving an object to be weighed, the weight of each object to be weighed while residing on said load receiving element being unevenly distributed across said plurality of load cells in a substantially known and like manner, the improvement comprising:
 said plurality of load cells are digital load cells adapted to provide a digital representation of a load thereon, and at least some of said digital load cells are of different capacity; and
 individual digital load cells are arranged along said load receiving element such that the capacity of a given individual load cell is commensurate with the proportion of the load that will be borne by that load cell as a result of the unevenly distributed weight of an object to be weighed by the weighing apparatus.

5. The improved weighing apparatus of claim 4, wherein said weighing apparatus is a vehicle scale.

6. The improved weighing apparatus of claim 5, wherein the capacity of load cells located near entry and exit ends of said load receiving element is less than the capacity of load cells located therebetween.

7. A weighing apparatus, comprising:
 a plurality of analog load cells, at least some of which are of different capacity;
 a load receiving element for receiving an object to be weighed, said load receiving element directly or indirectly supported by said plurality of load cells;
 at least one analog-to-digital conversion device for converting the outputs of said load cells into digital form; and
 at least one device for applying correction factors to the digitized output of said plurality of load cells;
 wherein the weight of each object to be weighed while residing on said load receiving element will be unevenly distributed across said plurality of load cells in a substantially known and like manner; and
 wherein individual load cells are arranged along said load receiving element such that the capacity of a given individual load cell is commensurate with the proportion of the load that will be borne by that load cell as a result of the unevenly distributed weight of an object to be weighed by the weighing apparatus.

8. The weighing apparatus of claim 7, wherein said weighing apparatus is a vehicle scale.

9. The weighing apparatus of claim 8, wherein the capacity of load cells located near entry and exit ends of said load receiving element is less than the capacity of load cells located therebetween.

10. The weighing apparatus of claim 7, wherein the number of analog-to-digital conversion devices present is equal to the number of load cells present.

11. The weighing apparatus of claim 7, wherein a single analog-to-digital conversion device sequentially converts the outputs of said load cells into digital form.

12. The weighing apparatus of claim 2, wherein the load cells are rocker pin load cells that reside beneath the load receiving element.

13. The weighing apparatus of claim 3, wherein the load cells are rocker pin load cells that reside beneath the load receiving element.

14. The improved weighing apparatus of claim 5, wherein the load cells are rocker pin load cells that reside beneath the load receiving element.

15. The improved weighing apparatus of claim 6, wherein the load cells are rocker pin load cells that reside beneath the load receiving element.

16. The weighing apparatus of claim 8, wherein the load cells are rocker pin load cells that reside beneath the load receiving element.

17. The weighing apparatus of claim 9, wherein the load cells are rocker pin load cells that reside beneath the load receiving element.

* * * * *